US006889962B2

(12) United States Patent
Laird et al.

(10) Patent No.: US 6,889,962 B2
(45) Date of Patent: May 10, 2005

(54) FLUID STREAM FEED DEVICE FOR MASS TRANSFER COLUMN

(75) Inventors: Dana G. Laird, Prescott, WI (US); Carol A. Schnepper, Tulsa, OK (US); Christoph Ender, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 10/635,125

(22) Filed: Aug. 6, 2003

(65) Prior Publication Data

US 2005/0029686 A1 Feb. 10, 2005

(51) Int. Cl.$^7$ ................................................ B01F 3/04
(52) U.S. Cl. ...................... 261/79.2; 261/96; 261/109
(58) Field of Search .......................... 261/79.2, 96, 98, 261/102, 105, 109

(56) References Cited

U.S. PATENT DOCUMENTS

| | | | | |
|---|---|---|---|---|
| 1,961,956 A | * | 6/1934 | Bleibtreu et al. | 96/258 |
| 3,472,001 A | * | 10/1969 | McMakin | 96/294 |
| 3,608,873 A | * | 9/1971 | Furlong | 261/30 |
| 3,637,195 A | | 1/1972 | Blazer et al. | |
| 4,770,747 A | | 9/1988 | Muller | 202/176 |
| 5,106,544 A | | 4/1992 | Lee et al. | 261/79.2 |
| 5,227,018 A | * | 7/1993 | Bro et al. | 159/4.02 |
| 5,516,465 A | | 5/1996 | Yeoman | 261/79.2 |
| 5,605,654 A | | 2/1997 | Hsieh et al. | 261/79.2 |
| 5,632,933 A | | 5/1997 | Yeoman et al. | |
| 6,341,765 B1 | | 1/2002 | Moser | |

FOREIGN PATENT DOCUMENTS

| | | |
|---|---|---|
| DE | 764103 | 9/1952 |
| FR | 2827791 | 1/2003 |

* cited by examiner

*Primary Examiner*—Scott Bushey
(74) *Attorney, Agent, or Firm*—J. David Wharton; Stinson Morrison Hecker LLP

(57) ABSTRACT

A mass transfer column includes a feed device that is used to de-entrain liquid and more uniformly distribute vapor across a horizontal cross section of the column after a vapor or mixed phase stream has been directed into the column through a radially oriented feed nozzle. The feed device includes an annular passageway formed in the spacing between the column shell and an inner wall spaced inwardly from the shell. A deflector with oppositely directed deflecting surfaces is positioned at an inlet from the feed nozzle to the annular passageway and splits the vapor or mixed phase stream into two roughly equal streams that flow in opposite circumferential directions in the annular passageway. At least one pair of turning vanes is spaced on opposite sides of the deflecting surfaces in the annular passageway to create subpassages through which the vapor or mixed phase stream flows. The subpassages reduce the amount of vapor or mixed phase stream flow that impacts against the inner wall of the feed device at the inlet. The turning vanes unexpectedly reduce the pressure drop that occurs as the vapor or mixed phase stream is redirected from its radial entry direction to the circumferential direction in the annular passageway. By reducing the pressure drop, improvements in product yield and vapor distribution can be achieved.

22 Claims, 3 Drawing Sheets

FLUID STREAM FEED DEVICE FOR MASS TRANSFER COLUMN

BACKGROUND OF THE INVENTION

This invention relates generally to mass transfer columns and, more particularly, to an apparatus and method for feeding a vapor or a vapor and liquid mixed phase stream into the column in a manner that allows a more uniform distribution of the vapor or mixed phase stream within the column. As used herein, the term "mixed phase stream" is intended to refer to a stream containing both vapor and liquid.

Mass transfer columns, including heat exchange columns, typically include an upright shell and a plurality of zones within the shell where contacting devices such as random or structured packing and/or horizontally disposed trays are used to facilitate mass or heat transfer between liquid streams flowing within the column. The liquid streams are normally decending liquid streams and ascending vapor stream, but other combinations of fluid streams are possible. As the liquid streams spread over the surface of the packing or tray, the surface area of contact between the streams increases, thereby facilitating the desired mass or heat transfer between the fluid streams. In order to increase the efficiency of the mass or heat transfer that takes place between the fluid streams, it is important that the fluid streams be uniformly distributed across the horizontal cross section of the column. When the fluid streams are vapor and liquid streams flowing countercurrently, this need for uniform distribution is particularly important at the lower vapor-liquid interface where ascending vapor enters the packing or other contacting device.

In columns of the type described above, vapor or mixed-phase streams are often introduced radially or tangentially into the column through a feed nozzle located below the zone containing the packing or other contacting device. The deflecting surfaces also facilitate de-entrapment of liquid droplets from mixed phase streams as the liquid droplets splash against and then flow downwardly along the deflecting surfaces. The vapor stream then rises through the zone and interacts with liquid flowing downwardly through the zone. Various feed devices, commonly referred to as vapor horns, have been developed in an attempt to interrupt the radial or tangential flow of the vapor or mixed phase stream as it enters the column from the feed nozzle and redirect it so that it rises in a more uniformly distributed manner across the horizontal cross section of the contact zone. These feed devices commonly utilize a generally annular passageway formed by the spacing between the column shell and an inner wall spaced radially inwardly from the shell. A top plate normally closes the top of the passageway and the vapor or mixed phase stream exits the passageway through the open bottom and/or through openings provided in the inner wall of the feed device. A deflector having oppositely directed deflecting surfaces is normally position at the location where the vapor or mixed phase stream enters the annular passageway. The deflecting surfaces of the deflector cause the vapor or mixed phase stream to be split into two equal or unequal streams that flow in opposite circumferential directions in the annular passageway. In the feed device disclosed in U.S. Pat. No. 5,106,544 to Lee et al., internal vanes are also positioned within the passageway and are oriented to redirect the vapor or mixed phase stream downwardly through the open bottom of the feed device.

The vapor or mixed phase stream entering the feed device from the nozzle can exert a large and/or unbalanced force on the deflecting surface of the deflector and the inner wall of the feed device. For example, when the feed nozzle is large and carries a high-speed vapor or mixed phase stream, the deflector and inner wall must have sufficient mechanical strength to withstand the large forces exerted by the vapor or mixed phase stream. In other situations, the vapor or mixed phase stream is not evenly split by the deflector and greater forces are exerted on the side of the deflector carrying the greater portion of the vapor or mixed phase stream. While the deflector and inner wall can be constructed of thicker gauge material to withstand these large and unbalanced forces, the additional weight of the thicker gauge material is generally undesirable because the component pieces of the feed device are normally hand carried into and assembled within the column.

In another approach that has been utilized to reduce the large, unbalanced force exerted by the vapor or mixed phase stream on the deflector and inner wall of the above-described feed devices, one or more upright vanes are used to subdivide the passageway on one side of the deflector into multiple subpassages and thereby reduce the volume of vapor flow that impacts the deflector and inner wall. The vanes are positioned in lateral spaced relationship at the feed device inlet where the vapor or mixed phase stream exits from the feed nozzle and enters the annular passageway. The vanes present an outer edge to the vapor or mixed phase stream exiting from the nozzle and are curved along their horizontal length to turn the vapor or mixed phase stream from its entry flow direction to a circumferential flow direction. Previously, the vanes have been used only on one side of the deflector to absorb large, unbalanced forces exerted by the vapor or mixed phase stream entering the feed devices. Use of these vanes has been limited to columns in which the nozzle diameter is large, i.e., on the order of 5 feet or greater, and unbalanced forces are also present because the vapor or mixed phase stream is split into two unequal portions by the deflector. The use of the vanes with smaller nozzles as well as those having equal flow splits has been thought to be unnecessary because the force of the vapor or mixed phase stream is small enough and balanced on the deflecting surfaces of the deflector so that normal gauge materials can readily absorb the impact of the entire vapor or mixed phase stream. Moreover, the use of vanes other than for force reduction purposes has been thought to be undesirable because of the expected increase in pressure drop resulting from frictional losses as the vapor or mixed phase stream flows along the surface of the vanes. As a result, it is believed that vanes of the type described have not previously been used with radial nozzles having equal vapor flow splits.

SUMMARY OF THE INVENTION

In one aspect, the present invention is directed to a mass transfer column of the type having an external upright shell defining an open internal region within the shell; a feed nozzle surrounding an opening in the shell and extending outwardly from the shell in radial alignment with a vertical center axis of said shell, the feed nozzle having a notional radially extending center vertical plane, the opening having a preselected diameter and defining an inlet passage; and a feed device within the open internal region and positioned in relation to the opening in the shell to deflect and redirect the vapor or mixed phase stream entering the open internal region through the feed nozzle. The feed device has an inner wall that is spaced inwardly from the shell and an annular passageway that is defined by the spacing between the inner wall and the shell and is in fluid flow communication with the inlet passage. A pair of upright deflecting surfaces extends from the inner wall of the feed device toward the opening surrounded by the feed nozzle. Each of the deflecting surfaces has an outer end positioned closer to the shell and an opposed inner end positioned closer to the inner wall of the feed device. The deflecting surfaces are preferably generally symmetrically oriented on opposite sides of the center vertical plane of the feed nozzle with the outer ends of the deflecting surfaces being positioned closer to the center vertical plane than the inner ends of the deflecting surfaces. The deflecting surfaces divide the entering vapor or mixed phase stream into roughly equal streams that flow in opposite circumferential directions in the annular passageway. The inner ends of the deflecting surfaces are also preferably secured to the inner wall of the feed device to transfer the force exerted on the deflecting surfaces by the vapor or mixed phase stream to the inner wall. In accordance with the present invention, at least a first pair of turning vanes are positioned on opposite sides of the center vertical plane of the feed nozzle and are circumferentially spaced from the deflecting surfaces in the annular passageway. The turning vanes each have a radially outer end and an opposed radially inner end with the outer end being located closer to the center vertical plane than the inner end. The turning vanes are preferably generally symmetrically oriented on said opposite sides of the center vertical plane. The turning vanes and deflecting surfaces divide the inlet passage into subpassages, with the total flow of the vapor or mixed phase stream being split among the subpassages. As a result, only a portion of the vapor or mixed phase stream entering the annular passageway of the feed device impacts against the inner wall. Additional pairs of turning vanes may be employed to further reduce the amount of the vapor or mixed phase stream that impacts against the inner wall of the feed device. The invention may also be employed with a second nozzle positioned diametrically opposite from the first nozzle.

It has been unexpectedly discovered that the presence of the turning vanes at the vapor or mixed phase stream inlet to the feed device reduces the pressure drop experienced by the vapor or mixed phase stream as it makes the nearly 90° turn from the feed nozzle into the feed device. It is believed that this reduction in pressure drop and resulting improvement in vapor distribution is achieved, in part, by reducing the amount of the vapor or mixed phase stream that impacts against the inner wall of the vapor horn. The turning vanes are also believed to contribute to reduced pressure drop by reducing the amount of recirculation that the vapor or mixed phase stream normally experiences in the area adjacent to the feed nozzle at the inlet wall. The ability of the turning vanes to reduce pressure drop was unexpected because it was previously believed that the turning vanes would partially obstruct the opening in the feed nozzle and cause greater pressure drop and increased turbulence. As a result of a computational fluid dynamics model study, it has been determined that the pressure drop is not only controlled by the cross sectional area available for vapor flow, but is also controlled by the effective area where the flow concentrates against the inner wall of the vapor horn. The reduction in pressure drop also improves product yield in situations where the feed device is located in a flash zone, such as in the case of crude vacuum columns. The improvement in the flow characteristics of the mixed phase stream can also improve liquid de-entrainment by avoiding formation of small liquid droplets or mist that are easily entrained when mixed phase feed impacts against the inner wall of a feed device.

In another aspect, the present invention is directed to a method of distributing a vapor or mixed phase stream within a column using a feed device with turning vanes as described above.

BRIEF DESCRIPTION OF THE SEVERAL VIEWS OF THE DRAWINGS

In the accompanying drawings which form part of the specification and are to be read in conjunction therewith and in which like reference numerals are used to indicate like parts in the various views.

DETAILED DESCRIPTION OF THE INVENTION

Figure 1:
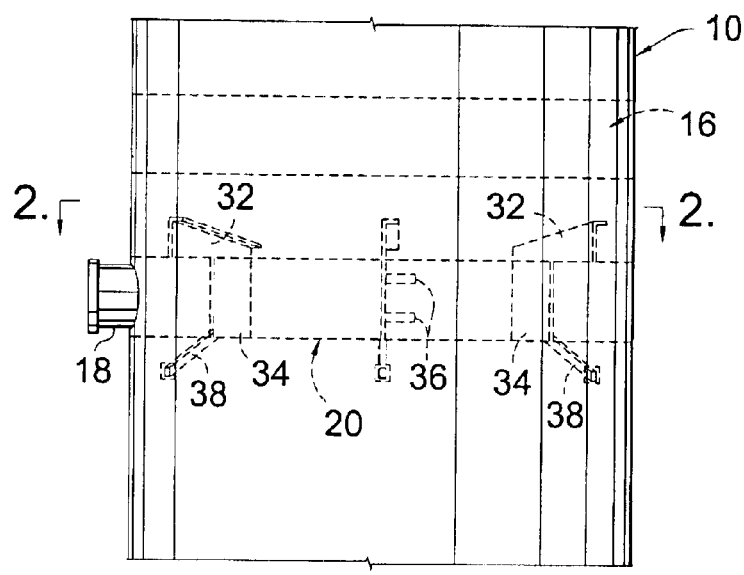
FIG. 1 is fragmentary side elevation view of a mass transfer column with a feed device of the present invention and a mass transfer zone shown in broken lines.

Turning now to the drawings in greater detail and initially to FIGS. 1–4, a column constructed in accordance with a first embodiment of the present invention is represented broadly by the numeral 10. Column 10 comprises a cylindrical exterior shell 12 and presents an open internal region 14 in which mass transfer and/or heat exchange between fluid streams occurs. A common use of such columns is to effect mass transfer between one or more downwardly flowing liquid streams and one or more ascending vapor stream. Alternatively, the fluid stream can both be liquid streams or a gas stream and a liquid stream.

Column 10 includes a zone 16 (FIG. 1) in which mass transfer devices such as trays or packing are positioned to facilitate interaction between the fluid streams flowing through the open internal region 14 of the column 10. The packing can be random or structured packing and multiple zones of such packing can be provided.

The fluid streams are directed to the column 10 through any suitable number of feed lines (not shown) positioned at appropriate locations along the height of the column 10. One or more vapor or mixed phase streams can also be generated within the column 10 rather than being introduced into the column 10 through one of the feed lines. It will be appreciated that liquid can and often is associated with the vapor and the use of the term "vapor" is intended to encompass the presence of liquid. Column 10 will also typically include an overhead line for removing a vapor product or byproduct and a bottom stream takeoff line for removing a liquid product or byproduct from the column 10. The various feed and removal lines, as well as other column components that are typically present, such as reflux stream lines, reboilers, condensers and the like are not illustrated in the drawings because they are conventional in nature and are not believed to be necessary for an understanding of the present invention.

A feed nozzle 18 extends radially outwardly from the shell 12 of the column 10 at a position spaced below the zone 16 containing the mass transfer devices. The feed nozzle 18 feeds a vapor or mixed phase stream into a feed device 20 positioned within the open internal region 14 in horizontal alignment with the feed nozzle 18. The feed device 20 is constructed to facilitate a more uniform horizontal distribution of the vapor or mixed phase stream after it is introduced into the column 10 through the feed nozzle 18. The vapor stream then rises upwardly through the mass transfer devices in the zone 16 in a more uniformly distributed manner that facilitates enhanced contact and interaction between the ascending vapor stream and the descending liquid stream.

The feed device 20 can be of various types including those commonly referred to as vapor horns. The feed device 20 comprises an annular passageway 22 that extends partially or completely around the inner circumference of the shell 12. The passageway 22 is formed in a spacing between the shell 12 and an inner wall 24 that is spaced radially inwardly from the shell 12 within the open internal region 14. Openings (not shown) may be provided in the inner wall 24 to permit a portion of the vapor or mixed phase stream to be discharged from the annular passageway 22 through the openings. A horizontally extending top plate 26 extends from the top edge of the inner wall 24 to the shell 12 and partially or completely closes the top of the passageway 22. The bottom of the passageway 22 is preferably partially or completely open to permit the vapor or mixed phase stream and de-entrained liquid to exit through the open bottom of the passageway 22.

The inner wall 24 of the feed device 20 is normally ring-shaped and vertically oriented but can be of a different construction if desired. The radial spacing between the inner wall 24 and the shell 12 can be constant but preferably decreases with increasing circumferential distance from the feed nozzle 18 so that the radial width of the annular passageway 22 likewise decreases. An end wall 28 is positioned in the passageway 22 diametrically opposite from the feed nozzle 18 to close the end of the passageway 22 in the circumferential direction. It can be seen that the positioning of the end wall 28 at this location allows the passageway 22 to extend completely about the inner perimeter of the shell 12, with the vapor or mixed phase stream able to flow 180° in opposite circumferential directions from the feed device 20. If it is desired for the passageway 22 to extend less than completely about the inner perimeter of the shell 12, a pair of end walls 28 is positioned at the desired ends of the passageway 22.

Preferably, a plurality of downwardly extending deflectors 30 is positioned in the passageway 22 at circumferentially spaced positions. An upper portion of each deflector 30 is curved in facing relation to the direction of vapor flow in the passageway 22. The vertical positioning of the deflectors 30 is staggered so that the deflectors 30 positioned closest to the feed nozzle 18 are positioned lower in the passageway 22 than those adjacent the end wall 28. In this manner, each deflector 30 redirects a roughly equal portion of the vapor or mixed phase stream flowing in the passageway 22 to cause it to flow downwardly out of the passageway 22.

The feed device 20 is secured to the shell 12 by gussets 32 that extend radially inwardly from the shell 12 above the feed device 20 and are welded or otherwise secured along their lower edges to the top plate 26. Each gusset 32 extends inwardly beyond the inner wall 24 of the feed device 20 and is joined to a baffle 34 that extends upwardly along the inner face of the inner wall 24. The baffles 34 function to disrupt any cyclonic swirling of the vapor stream that may occur as it rises through the open center of the feed device 20 after exiting the annular passageway 22. A pair of angled braces 36 extends from each baffle 34 to the inner wall 24 of the feed device 20 to strengthen the braces 36. Similar braces 38 underlie the feed device 20 and extend from the inner wall 24 to the shell 20 to support the feed device 20.

Figure 2:
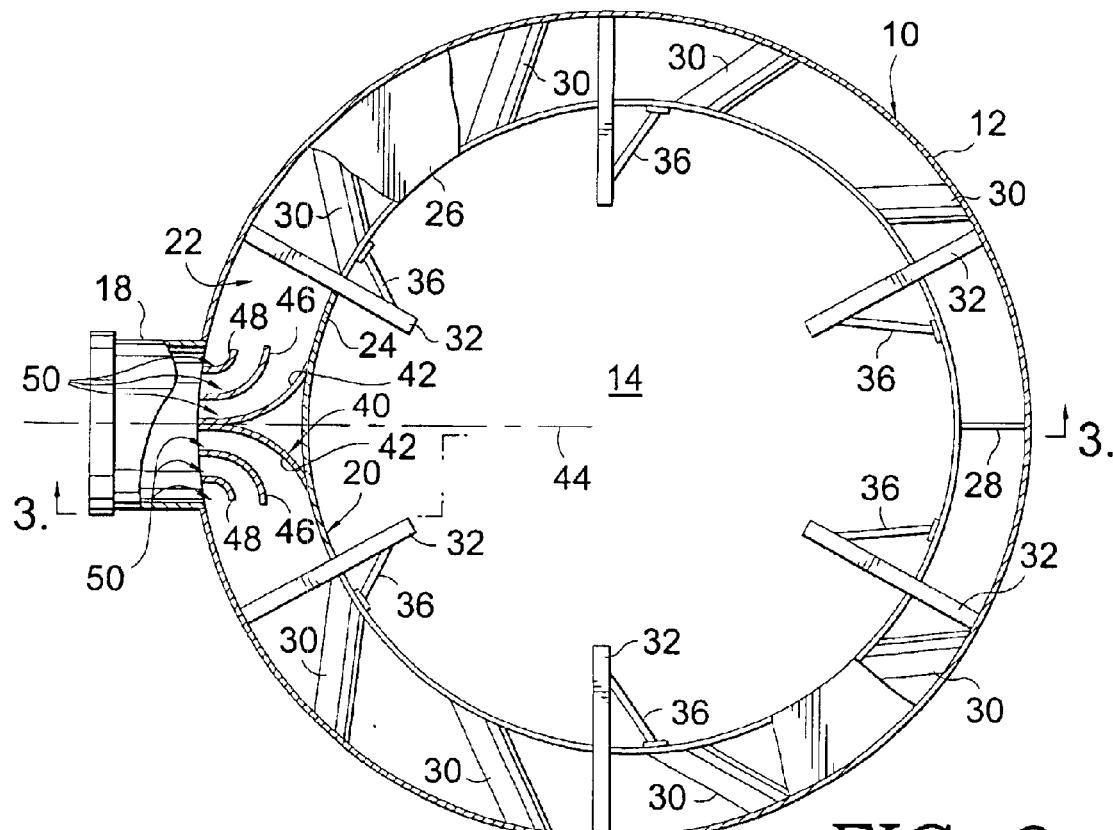
FIG. 2 is an enlarged top plan view of the column taken in horizontal section along line 2—2 of FIG. 1 in the direction of the arrows and with portions of the feed device broken away to illustrate details of construction.
Figure 3:
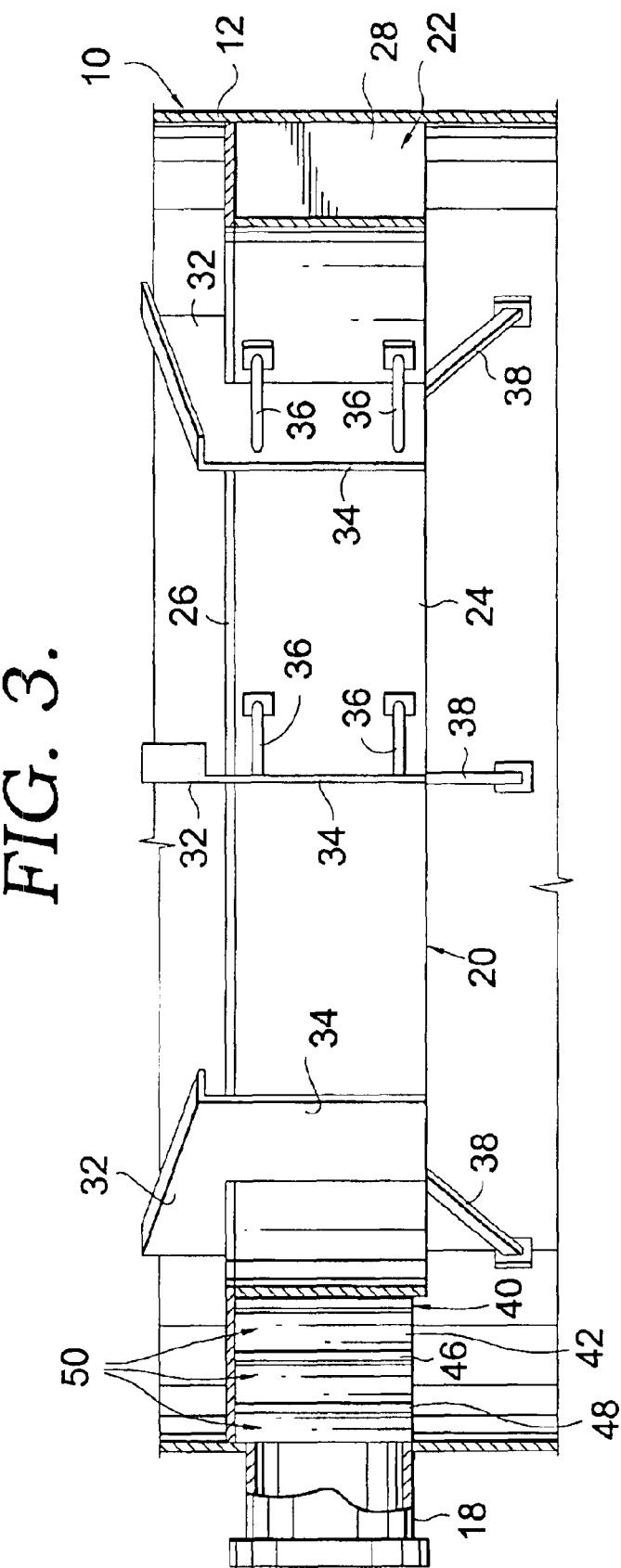
FIG. 3 is a further enlarged, fragmentary side elevation view of the column and feed device taken in vertical section along line 3—3 of FIG. 2 in the direction of the arrows.
Figure 4:
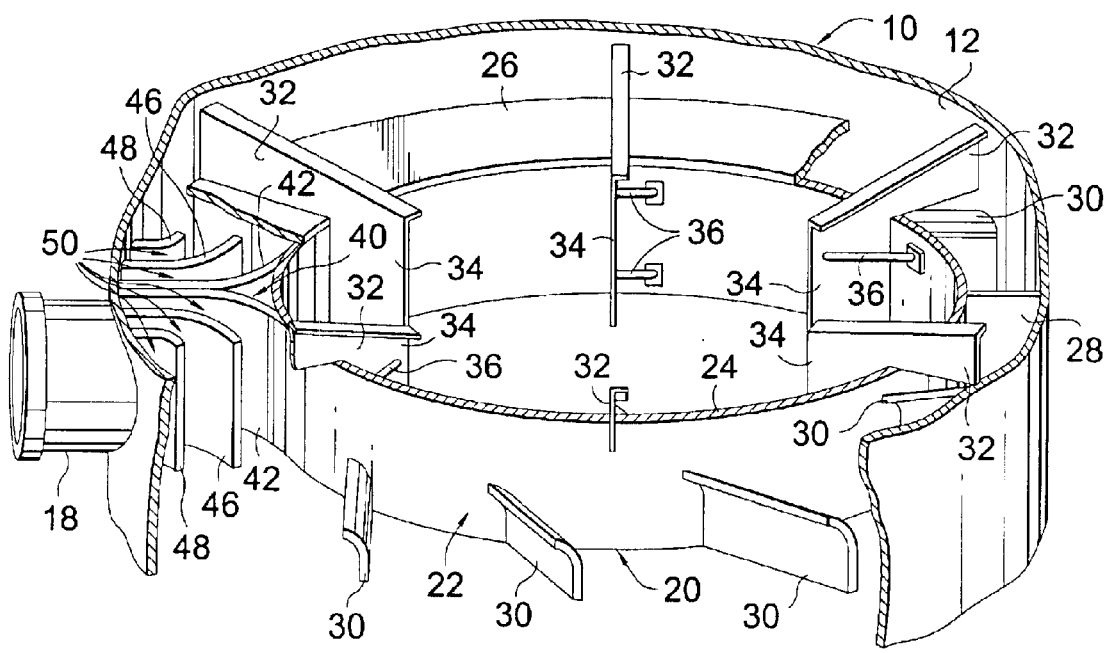
FIG. 4 is a fragmentary top perspective view of the column and feed device.

Turning more specifically to FIGS. 2–4, a deflector 40 presenting a pair of curved deflecting surfaces 42 is positioned at an inlet from the feed nozzle 18 to the feed device 20. The deflecting surfaces 42 are preferably vertically oriented and have inner and outer ends. The inner ends are welded or otherwise secured to the inner wall 24 so that the force of the vapor or mixed phase stream impacting against the deflecting surfaces 42 is transferred to the ring-shaped inner wall 24. The outer ends of the deflecting surfaces 42 are positioned closer than the inner ends to a notional center vertical plane 44 (FIG. 2) that extends radially from a center axis of the column through the feed nozzle 18. Preferably, the deflecting surfaces 42 are symmetrically positioned on opposite sides of the center vertical plane 44 with the outer ends of the deflecting surfaces 42 positioned on or close to the center vertical plane 44 so that the entering vapor or mixed phase stream is split into roughly equal portions that then flow in opposite circumferential directions in the annular passageway 22. The spacing between the inner end of one deflecting surface 42 and the inner end of the other deflecting surface 42 is determined by the desired arc of the curved deflecting surfaces 42. The deflecting surfaces 42 preferably extend outwardly a preselected radial distance and, preferably, a sufficient distance to position the outer ends of the deflecting surfaces 42 at the opening in the column shell 12 that is surrounded by the feed nozzle 18.

In accordance with the present invention, at least a first pair of turning vanes 46 is positioned in the annular passageway 22 on opposite sides of the center vertical plane 44. The turning vanes 46 are generally vertically oriented and each is spaced a preselected distance from an adjacent deflecting surface 42. The turning vanes 46 are preferably curved along their horizontal cross section and are positioned with their outer ends located closer to the center vertical plane 44 than their inner ends. Preferably, the turning vanes 46 are symmetrically oriented on opposite sides of the center vertical plane 44 in the same manner as the deflecting surfaces 42. A second pair of turning vanes 48 is likewise positioned in spaced relation to the first pair of turning vanes 46 opposite from the deflecting surfaces 42. The second pair of turning vanes 48 is constructed similarly to the first pair of turning vanes 46. Additional pairs of turning vanes can be provided in the same manner. For example, in large diameter columns, up to five pairs of turning vanes may be used. The turning vanes 46 and 48 are secured in any suitable fashion, such as by welding to the top plate 26 and an optional bottom plate segment (not shown) located in the inlet area.

The inlet from the feed nozzle 18 to the annular passageway 22 is subdivided into subpassages 50 by the deflecting surfaces 42 and the pairs of turning vanes 46 and 48. The vapor or mixed phase stream entering the annular passageway 22 is split among and flows through the subpassages 50 as it makes the 90° turn from the radial entry direction to the circumferential flow direction in the feed device 20. It can be appreciated that only that portion of the vapor or mixed phase stream flowing through the subpassages 50 closest to the center vertical plane 44 will impact against the inner wall 24 of the feed device 20 during this transition from radial to circumferential flow. The pairs of turning vanes 46 and 48 can be spaced apart such that the subpassages 50 have roughly equal vertical cross-sectional areas or generally equal transverse widths. Preferably, constant ratios of flow cross sectional area are maintained throughout the entire arc of the turning vanes 46 and 48. For example, in some applications the diameter of the opening in the column shell 12 that is surrounded by the feed nozzle 18 is roughly the same as the radial width of the annular passageway 22. In such applications, the subpassages 50 will have the same cross sectional area at their inlet ends and outlet ends because the turning vanes 46 and 48 and deflecting surfaces 42 will extend along parallel arcs. In other applications, the subpassages 50 will have a greater or lesser inlet area because the feed nozzle 18 opening is greater or lesser than the radius of the annular passageway 22.

It has been unexpectedly discovered through a computational fluid dynamics model study comparing a feed device with and without turning vanes 46 and 48 that the presence of the turning vanes 46 and 48 reduces the pressure drop of the vapor stream from 4.28 mm Hg to 2.97 mm Hg as it is delivered to the feed device 20 in the column 10 through nozzle 18. The turning vanes 46 and 48 also reduce the peak vapor velocity as the vapor stream enters the mass transfer zone 16 without impacting the velocity distribution across the zone 16. It is believed that this reduction in pressure drop and improvement in vapor distribution is achieved as a result of two factors. First, the turning vanes 46 and 48 reduce the amount of vapor flow impacting against the inner wall 24 of the feed device 20. If the turning vanes 46 and 48 were not present, the entire vapor or mixed phase stream would experience greater acceleration when it makes the nearly 90° turn from the feed nozzle 18 into the feed device 20 and flows through a relatively small cross sectional area prior to impacting against the inner wall 24 of the feed device 20. The vapor or mixed phase stream then decelerates as it travels further along the feed device 20 and expands back across the entire cross sectional area of the annular passageway 22. Because the turning vanes 46 and 48 split off portions of the vapor or mixed phase stream before it impacts against the inner wall 24 of the feed device 20, the vapor or mixed phase stream experiences less acceleration/deceleration, resulting in a reduction in pressure drop. The turning vanes 46 and 48 also contribute to reduced pressure drop by reducing the amount of recirculation that the vapor or mixed phase stream normally experiences in the area adjacent to the feed nozzle 18 at the inlet to annular passageway 22. This recirculation is caused by a low pressure area formed adjacent to the feed nozzle 18 as the vapor or mixed phase stream enters the annular passageway 22. This low pressure area causes a portion of the vapor or mixed phase stream to recirculate back towards the feed nozzle 18, causing increased swirling of the vapor or mixed phase stream and increased pressure drop. The ability of the turning vanes 46 and 48 to reduce pressure drop was unexpected because it was assumed that the turning vanes would partially obstruct the opening in the shell 12 that is surrounded by the feed nozzle 18 and cause greater pressure drop and increased swirling of the vapor or mixed phase stream. It has been determined, however, that the pressure drop is not controlled only by the cross sectional area available for vapor flow, but is also controlled by the effective area where the flow concentrates against the inner wall 24 of the feed device 20. This reduction in pressure drop can also increase product yield in those applications where the feed device 20 is located within a flash zone. For example, in crude vacuum columns, reducing pressure at the feed device 20 increases the amount of flash that can occur, thereby increasing product yield. Improvements in the flow characteristics of the mixed phase stream also reduces the severity of the splashing of the liquid against the surfaces of the feed device 20, thereby allowing formation of larger and easier to de-entrain liquid droplets.

Figure 5:
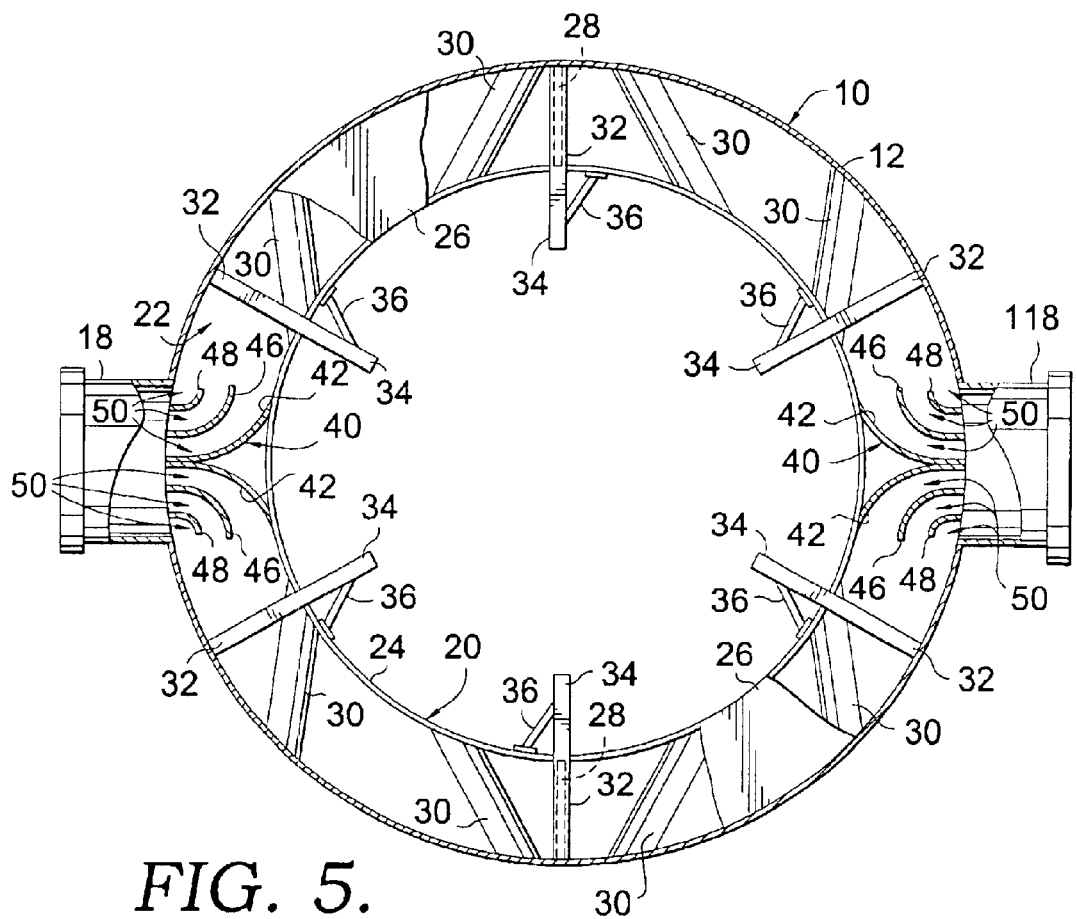
FIG. 5 is a top plan view of a column having an alternate embodiment of the feed device in which a second feed nozzle is employed.

While the invention has been described with respect to a single radial feed nozzle 18, it will be appreciated that a second such nozzle 118 can be provided at a location diametrically opposite from the first nozzle 18, as shown in FIG. 5. In this embodiment, two end walls 28 are positioned 90° from the nozzles 18 and 118 so that each vapor or mixed phase stream flows 90° about the circumference of the annular passageway 22. It will also be appreciated that the benefits of placing turning vanes on both sides of the deflector 40 can be achieved even though the feed nozzles are not positioned in a completely radial orientation. This is contemplated by and within the scope of the present invention.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and within the scope of the invention. Since many possible embodiments may be made of the invention without departing from the scope thereof, it is to be understood that all matter herein set forth or shown in the accompanying drawings is to be interpreted as illustrative and not in a limiting sense.

The invention claimed is:

1. A mass transfer column comprising:
   an external upright shell defining an open internal region within the shell;
   a feed nozzle surrounding an opening in the shell and extending outwardly from the shell, said feed nozzle having a notional center vertical plane extending along a longitudinal axis of said feed nozzle, said opening having a preselected diameter and defining an inlet passage;
   a feed device within said open internal region and positioned in relation to said opening in the shell to deflect a vapor or mixed phase stream entering said open internal region through said feed nozzle, said feed device comprising an inner wall spaced inwardly from said shell and defining an annular passageway in a space between said inner wall and said shell, said annular passageway being in fluid flow communication with said inlet passage;
   a pair of upright deflecting surfaces extending from said inner wall toward said opening, each of said deflecting surfaces having an outer end closer to the shell and an opposed inner end closer to the inner wall of the feed device, the deflecting surfaces being generally symmetrically oriented on opposite sides of the center vertical plane of the feed nozzle with the outer ends of the deflecting surfaces being positioned closer to the center vertical plane than the inner ends of the deflecting surfaces; and
   at least a first pair of turning vanes positioned on opposite sides of the center vertical plane of the feed nozzle and spaced from said deflecting surfaces in said annular passageway, each said turning vane having a radially outer end and an opposed radially inner end with said outer end being located closer to said center vertical plane than the inner end.

2. The mass transfer column of claim 1, wherein said turning vanes are generally symmetrically oriented on said opposite sides of the center vertical plane.

3. The mass transfer column of claim 2, wherein said turning vanes and deflecting surfaces divide the inlet passage into subpassages of generally equal transverse widths.

4. The mass transfer column of claim 2, wherein said turning vanes and deflecting surfaces divide the inlet passage into subpassages of generally equal vertical cross-sectional area.

5. The mass transfer column of claim 2, wherein each of said turning vanes extends vertically and is curved along a horizontal length of the turning vane.

6. The mass transfer column of claim 5, including a second pair of turning vanes generally symmetrically oriented on opposite sides of the center vertical plane of the feed nozzle, the second pair of turning vanes being spaced from the first set of turning vanes on each side of the center vertical plane.

7. The mass transfer column of claim 6, wherein said first and second pairs of turning vanes and said deflecting surfaces divide the inlet passage into subpassages of generally equal transverse width.

8. The mass transfer column of claim 6, wherein said first and second pairs of turning vanes and said deflecting surfaces divide the inlet passage into subpassages of generally equal vertical cross-sectional area.

9. The mass transfer column of claim 2, wherein said diameter of the opening in the shell is greater than a radial width of the annular passageway.

10. The mass transfer column of claim 2, including a second feed nozzle extending outwardly from the shell in an opposite direction from said first feed nozzle in radial alignment with the vertical center.

11. The mass transfer column of claim 2, wherein said inner ends of the deflecting surfaces are coupled with the inner wall of the feed device.

12. A mass transfer column comprising:

an external upright shell defining an open internal region within the shell;

a feed nozzle surrounding an opening in the shell and extending outwardly from the shell in radial alignment with a vertical center axis of said shell, said feed nozzle having a notional radially extending center vertical plane, said opening having a preselected diameter and defining an inlet passage;

a feed device within said open internal region and positioned in relation to said opening in the shell to deflect a vapor or mixed phase stream entering said open internal region through said feed nozzle, said feed device comprising an inner wall spaced inwardly from said shell and defining an annular passageway in a space between said inner wall and said shell, said annular passageway being in fluid flow communication with said inlet passage;

a pair of upright deflecting surfaces extending from said inner wall toward said opening, each of said deflecting surfaces having an outer end closer to the shell and an opposed inner end closer to the inner wall of the feed device, the deflecting surfaces being generally symmetrically oriented on opposite sides of the center vertical plane of the feed nozzle with the outer ends of the deflecting surfaces being positioned closer to the center vertical plane than the inner ends of the deflecting surfaces; and at least a first pair of turning vanes positioned on opposite sides of the center vertical plane of the feed nozzle and spaced from said deflecting surfaces in said annular passageway, each said turning vane having a radially outer end and an opposed radially inner end with said outer end being located closer to said center vertical plane than the inner end.

13. The mass transfer column of claim 12, wherein said turning vanes are generally symmetrically oriented on said opposite sides of the center vertical plane.

14. The mass transfer column of claim 13, wherein said turning vanes and deflecting surfaces divide the inlet passage into subpassages of generally equal transverse widths.

15. The mass transfer column of claim 13, wherein said turning vanes and deflecting surfaces divide the inlet passage into subpassages of generally equal vertical cross-sectional area.

16. The mass transfer column of claim 13, wherein each of said turning vanes extends vertically and is curved along a horizontal length of the turning vane.

17. The mass transfer column of claim 16, including a second pair of turning vanes generally symmetrically oriented on opposite sides of the center vertical plane of the feed nozzle, the second pair of turning vanes being spaced from the first set of turning vanes on each side of the center vertical plane.

18. The mass transfer column of claim 17, wherein said first and second pairs of turning vanes and said deflecting surfaces divide the inlet passage into subpassages of generally equal transverse width.

19. The mass transfer column of claim 17, wherein said first and second pairs of turning vanes and said deflecting surfaces divide the inlet passage into subpassages of generally equal vertical cross-sectional area.

20. The mass transfer column of claim 13, wherein said diameter of the opening is greater than a radial width of the annular passageway.

21. The mass transfer column of claim 13, including a second feed nozzle extending outwardly from the shell in an opposite direction from said first feed nozzle in radial alignment with the vertical center.

22. The mass transfer column of claim 13, wherein said inner ends of the deflecting surfaces are coupled with the inner wall of the feed device.

* * * * *

UNITED STATES PATENT AND TRADEMARK OFFICE
CERTIFICATE OF CORRECTION

PATENT NO. : 6,889,962 B2
DATED : May 10, 2005
INVENTOR(S) : Dana G. Laird et al.

It is certified that error appears in the above-identified patent and that said Letters Patent is hereby corrected as shown below:

Column 1,
Lines 18, 19 and 22, delete "liquid" and insert -- fluid -- therefore.
Line 38, delete "de-entrapment" and insert -- de-entrainment -- therefore.

Signed and Sealed this

First Day of November, 2005

JON W. DUDAS
*Director of the United States Patent and Trademark Office*